United States Patent
Okita

(10) Patent No.: US 9,684,224 B2
(45) Date of Patent: Jun. 20, 2017

(54) LIGHT ADJUSTING APPARATUS AND METHOD FOR MEASURING DISTANCE BETWEEN SUBSTRATES OF LIGHT ADJUSTING APPARATUS

(71) Applicant: OLYMPUS CORPORATION, Tokyo (JP)

(72) Inventor: Tatsuhiko Okita, Akiruno (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/291,460

(22) Filed: Oct. 12, 2016

(65) Prior Publication Data

US 2017/0031233 A1 Feb. 2, 2017

Related U.S. Application Data

(63) Continuation of application No. PCT/JP2015/060366, filed on Apr. 1, 2015.

(30) Foreign Application Priority Data

Apr. 14, 2014 (JP) .................................. 2014-083048

(51) Int. Cl.
G03B 9/02 (2006.01)
G01B 11/14 (2006.01)
G03B 9/04 (2006.01)

(52) U.S. Cl.
CPC ................ *G03B 9/02* (2013.01); *G01B 11/14* (2013.01); *G03B 9/04* (2013.01)

(58) Field of Classification Search
CPC . G03B 9/02; G03B 9/04; G03B 43/00; G03B 43/02
See application file for complete search history.

(56) References Cited

U.S. PATENT DOCUMENTS

| 4,326,787 | A | * | 4/1982 | Senuma | G03B 9/18 396/449 |
| 5,758,213 | A | * | 5/1998 | Goto | G03B 7/10 396/235 |
| 2011/0267669 | A1 | | 11/2011 | Ide | |
| 2011/0292484 | A1 | * | 12/2011 | Ide | G02B 5/005 359/230 |
| 2015/0234175 | A1 | * | 8/2015 | Matsuki | G02B 26/00 359/814 |
| 2017/0031233 | A1 | * | 2/2017 | Okita | G03B 9/02 |

FOREIGN PATENT DOCUMENTS

| EP | 2388645 A1 | 11/2011 |
| JP | H10-020360 A | 1/1998 |
| JP | 2010-186168 A | 8/2010 |
| WO | WO 2010/082583 A1 | 7/2010 |

OTHER PUBLICATIONS

International Search Report dated Jun. 30, 2015 issued in PCT/JP2015/060366.

* cited by examiner

*Primary Examiner* — W B Perkey
(74) *Attorney, Agent, or Firm* — Scully, Scott, Murphy & Presser, P.C.

(57) ABSTRACT

A light adjusting apparatus includes a first substrate, a second substrate, a spacer configured to form a space for disposing a light adjusting section between the first substrate and the second substrate, a notch provided so that measuring light to measure a space dimension reaches the spacer and an extending peripheral portion provided so that the measuring light reaches the second substrate.

13 Claims, 10 Drawing Sheets

OUTPUT WAVEFORM

LIGHT ADJUSTING APPARATUS AND METHOD FOR MEASURING DISTANCE BETWEEN SUBSTRATES OF LIGHT ADJUSTING APPARATUS

CROSS REFERENCE TO RELATED APPLICATION

This application is a continuation application of PCT/JP2015/060366 filed on Apr. 1, 2015 and claims benefit of Japanese Application No. 2014-083048 filed in Japan on Apr. 14, 2014, the entire contents of which are incorporated herein by this reference.

BACKGROUND OF THE INVENTION

1. Field of the Invention

The present invention relates to a light adjusting apparatus with a light adjusting section arranged in a space between substrates and a method for measuring a distance between substrates of the light adjusting apparatus.

2. Description of the Related Art

Image pickup apparatuses having an image pickup function are widely used in various fields, and in a field among them, small image pickup apparatuses, which have a relatively small shape, are used. Some examples of such small image pickup apparatuses include an electronic endoscope including a micro videoscope, an optical microscope provided with an image pickup function and a portable apparatus provided with an image pickup function.

With conventional small image pickup apparatuses, priority is given to miniaturization, and therefore a fixed focus lens, a fixed aperture diaphragm, a fixed characteristic filter or the like have been adopted as optical elements such as a lens, a diaphragm or an optical filter.

In contrast, high image quality is also required for such small image pickup apparatuses in recent years and a demand for adopting a focus lens, a variable diaphragm, a variable characteristic filter or the like, that is, a demand for functions as light adjusting apparatuses that adjust light as optical elements of the aforementioned light adjusting apparatuses, is growing.

Thus, many techniques for downsizing light adjusting apparatuses so as to be applicable to small image pickup apparatuses are proposed.

As an example, Japanese Patent Application Laid-Open Publication No. 10-20360 describes a configuration in which a coil body is arranged between an upper cover and a lower cover, and a rotor polarized into two poles by a magnetic field generated by the coil body is rotated. A diaphragm blade member is integrally and rotatably attached to the rotor via a shaft and the diaphragm blade member goes into or comes out of the optical axis as the rotor rotates to adjust incident light.

SUMMARY OF THE INVENTION

A light adjusting apparatus according to an aspect of the present invention is provided with a first substrate, a second substrate whose substrate surface is disposed so as to face a substrate surface of the first substrate, a spacer configured to separate the first substrate from the second substrate so as to form a space between the substrate surfaces facing each other, a light adjusting section disposed so as to be movable in the space and configured to adjust light, and a measured section provided so that measuring light radiated from a measuring direction perpendicular to the substrate surface to measure a dimension of the space passes through one of the first substrate and the second substrate in the measuring direction and reaches another of the first substrate and the second substrate.

A method for measuring a distance between substrates of a light adjusting apparatus according to an aspect of the present invention is a method for measuring a distance between substrates of a light adjusting apparatus, the light adjusting apparatus including a first substrate, a second substrate whose substrate surface is disposed so as to face a substrate surface of the first substrate, a spacer configured to separate the first substrate from the second substrate so as to form a space between the substrate surfaces facing each other, a light adjusting section disposed so as to be movable in the space and configured to adjust light, and a measured section provided so that measuring light radiated from a measuring direction perpendicular to the substrate surface to measure a dimension of the space passes through one of the first substrate and the second substrate in the measuring direction and reaches another of the first substrate and the second substrate, the measured section including a first measured section configured to measure a distance from a side of the first substrate to the spacer and a second measured section configured to measure a distance from the first substrate side to the second substrate, the method including a step of measuring a distance to the spacer by radiating the measuring light via the first measured section, a step of measuring a distance to the second substrate by radiating measuring light via the second measured section, and a step of acquiring the dimension of the space by subtracting the distance to the spacer from the distance to the second substrate.

DETAILED DESCRIPTION OF THE PREFERRED EMBODIMENTS

Hereinafter, embodiments of the present invention will be described with reference to the accompanying drawings.

Embodiment 1

FIG. 1 to FIG. 10 illustrate Embodiment 1 of the present invention.

Figure 1:
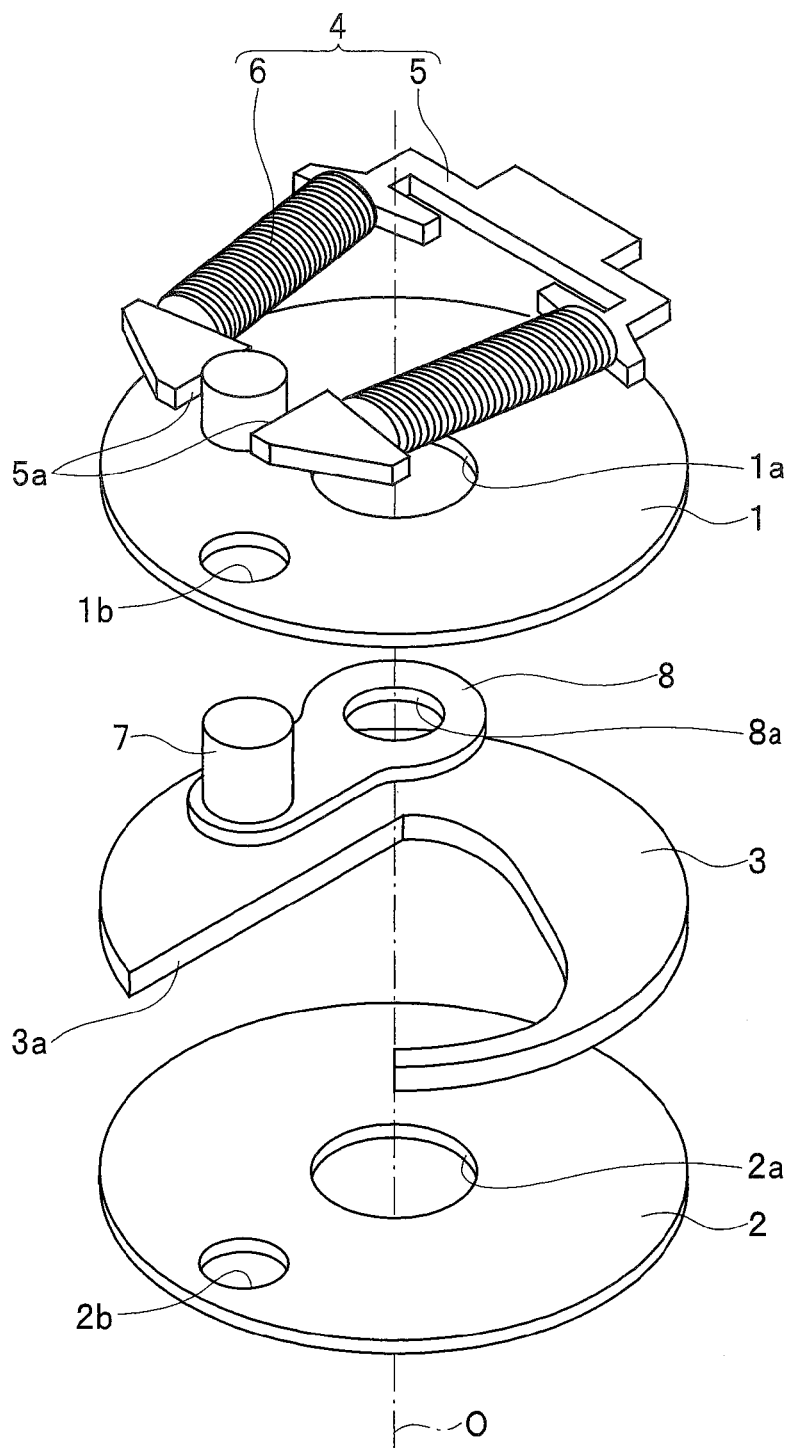
FIG. 1 is an exploded perspective view illustrating a basic configuration of a light adjusting apparatus according to Embodiment 1 of the present invention, shown as being extended in an optical axis direction.
Figure 2:
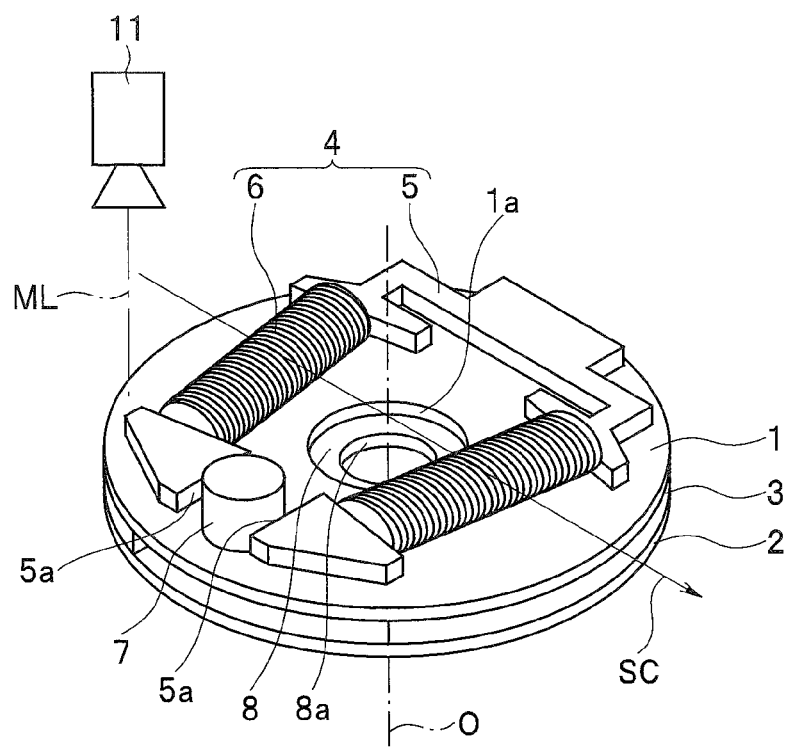
FIG. 2 is a perspective view illustrating the basic configuration of the light adjusting apparatus according to Embodiment 1 of the present invention.
Figure 3:
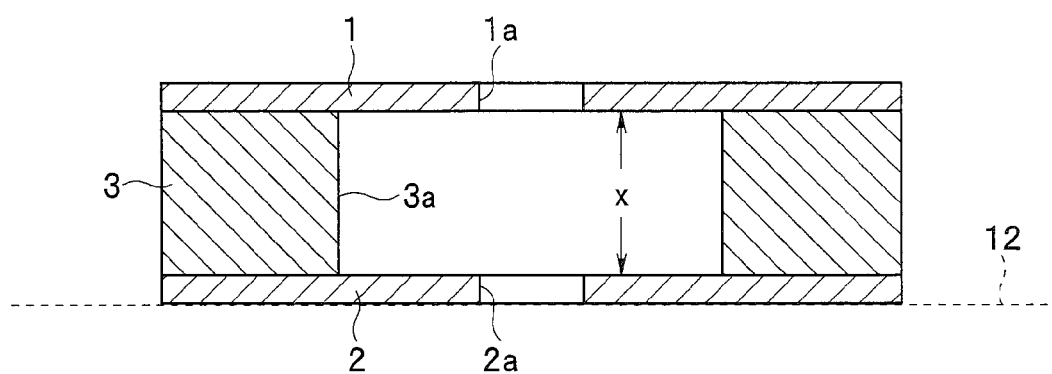
FIG. 3 is a cross-sectional view illustrating a space formed between a first substrate and a second substrate of the light adjusting apparatus according to Embodiment 1 of the present invention.

A basic configuration of a light adjusting apparatus will be described with reference to FIG. 1 to FIG. 3. Here, FIG. 1 is an exploded perspective view illustrating a basic configuration of a light adjusting apparatus, shown as being extended in an optical axis direction, FIG. 2 is a perspective view illustrating the basic configuration of the light adjusting apparatus and FIG. 3 is a cross-sectional view illustrating a space formed between a first substrate and a second substrate of the light adjusting apparatus.

A light adjusting apparatus is intended to adjust light, and some examples of the adjustment referred to here include light quantity adjustment and pupil adjustment by a diaphragm, light quantity adjustment by an ND filter, condensing adjustment by a lens, polarization adjustment by a polarization filter, band adjustment by a color filter, passage time period adjustment by a shutter or a combination of these adjustments, but the adjustment is not limited to them and any optical adjustment is widely applicable.

Hereinafter, a case will be described as an example where light adjustment is adjustment using a diaphragm.

The light adjusting apparatus includes a first substrate 1, a second substrate 2, a spacer 3, an electromagnetic drive source 4 including a coil core member 5 and a coil 6, a rotation shaft member 7 and a light adjusting section 8.

The first substrate 1 includes an opening 1a configured to pass light through the opening 1a and a shaft hole 1b configured to insert a one end side in an axial direction of a rotation shaft member 7 through the shaft hole 1b, and the electromagnetic drive source 4 is disposed on one surface side of the first substrate 1.

The second substrate 2 is disposed so that a substrate surface of the second substrate 2 faces the other surface side of the first substrate 1 (that is, the side opposite to the surface on which the electromagnetic drive source 4 of the first substrate 1 is disposed) via the spacer 3, parallel to the first substrate 1 at a predetermined distance, and includes an opening 2a to pass light through the opening 2a and a shaft hole 2b to insert the other end side of the rotation shaft member 7 in the axial direction through the shaft hole 2b.

The opening 1a of the first substrate 1 and the opening 2a of the second substrate 2 are formed at the center of the respective substrates 1 and 2 as, for example, circular openings, and an optical axis O of a main optical system, which is not shown, is configured to pass through, for example, the centers of the openings 1a and 2a perpendicular to the substrate surfaces of the first substrate 1 and the second substrate 2. Note that the opening 1a or the opening 2a may be an optical opening that functions as an aperture in a main optical system, which is not shown.

The shaft hole 1b and the shaft hole 2b are intended to attach and rotatably support the rotation shaft member 7 so that the rotation shaft member 7 is rotatable around a central axis of rotation perpendicular (that is, parallel to the optical axis O) to the substrate surfaces of the first substrate 1 and the second substrate 2.

The spacer 3 is intended to separate the first substrate 1 from the second substrate 2 so as to form a space between the substrate surfaces facing each other of the first substrate 1 and the second substrate 2. This spacer 3 is provided with a notch 3a to secure a space in which the light adjusting section 8 rotates and the notch 3a also defines a rotation range of the light adjusting section 8.

The electromagnetic drive source 4 is disposed on a surface of the first substrate 1 opposite to the spacer 3, includes the coil core member 5 formed of a magnetic body and the coil 6 wound around the coil core member 5, and is a drive source configured to rotate the rotation shaft member 7 by transmitting a magnetic force generated by passing a current through the coil 6 to the rotation shaft member 7 via the coil core member 5.

Here, the rotation shaft member 7 is configured as a rod-like (e.g., columnar) permanent magnet (axial magnet) magnetized so as to have different magnetic poles around the shaft. This rotation shaft member 7 has, for example, a two-pole configuration and is magnetized so that one semicircular column portion of the columnar shape becomes an S-pole and the other semicircular column portion becomes an N-pole.

The coil core member 5 is also called a "coil core" or "yoke," made of a magnetic body such as permalloy or silicon steel and formed into an open curve shape (that is, a shape including a cut in part of the closed curve) having two core member ends 5a, and in the illustrated example, the coil core member 5 has a substantially triangular shape, one vertex of which constitutes an open end. A pair of core member ends 5a which constitute open ends of the substantially triangular shape contactlessly sandwich both sides of an outside face of the rotation shaft member 7 (both sides of the circumferential surface of the rotation shaft member 7 because the rotation shaft member 7 has a columnar shape in the illustrated example). Thus, the coil core member 5 and the rotation shaft member 7 together constitute a closed magnetic circuit to transmit magnetism generated by the coil 6.

The coil 6 is wound around at least one location (two locations in the illustrated example) along the magnetic path of the open curved coil core member 5 and configured to generate a magnetic force by passing a current through the coil 6.

The light adjusting section 8 is a light adjusting member configured to adjust (by optically changing light as described above) and emit light incident from the opening 1*a* or the opening 2*a* and is integrally and rotatably fixed to the aforementioned rotation shaft member 7 and is arranged so as to be movable within the aforementioned space having the predetermined distance between the first substrate 1 and the second substrate 2. Therefore, the light adjusting section 8 rotates within the space as the rotation shaft member 7 rotates. Here, the light adjusting section 8 in the present embodiment is provided with a diaphragm opening 8*a* and constitutes a diaphragm blade configured to change a passage range of a luminous flux when inserted into the optical path of the main optical system, which is not shown as described above.

In the aforementioned configuration, when a current in one direction is passed through the coil 6, one of the two core member ends 5*a* of the coil core member 5 is magnetized to an S-pole and the other is magnetized to an N-pole, whereas when a current in the other direction is passed through the coil 6, the magnetized poles are reversed. Thus, an attracting force is generated between the N-pole/S-pole of the rotation shaft member 7 and the S-pole/N-pole of the core member end 5*a* and a repulsive force is generated between the N-pole/S-pole of the rotation shaft member 7 and the N-pole/S-pole of the core member end 5*a*. Such a magnetic force causes the rotation shaft member 7 to rotate clockwise or counterclockwise.

In this case, the light adjusting section 8 is located at a retracted position retracted from an optical path of light passing through the openings 1*a* and 2*a* by contacting one end side of the notch 3*a* and is located at an insertion position inserted into the optical path of light passing through the openings 1*a* and 2*a* by contacting the other end side of the notch 3*a*, and the area between the retracted position and the insertion position constitutes a rotatable range.

Thus, the light adjusting section 8 rotates together with the rotation shaft member 7 driven by the electromagnetic drive source 4 and displaces between the retracted position and the insertion position to thereby adjust light.

Note that the electromagnetic drive source 4 that generates a drive force through magnetic action has been taken as an example of the drive source for rotating the rotation shaft member 7 above, but a drive source of another configuration may also be adopted.

Since the light adjusting section 8 rotates in the space between the first substrate 1 and the second substrate 2 made up of the notch 3*a* of the spacer 3, the accuracy of a distance x (see FIG. 3) of the space in the optical axis O direction is important for smooth rotation operation.

The respective components that make up the light adjusting apparatus are adjusted to have predetermined sizes and shapes at predetermined accuracy in the manufacturing stage of the components, but it is after the light adjusting apparatus is assembled with the components that the distance x of the aforementioned space becomes important.

Thus, the light adjusting apparatus after the assembly is measured. Examples of the method for measuring the light adjusting apparatus include:

(1) Method of manual measurement using a measuring instrument from a side face direction perpendicular to the optical axis O; and (2) Method of scanning using laser from a direction parallel to the optical axis O using a laser displacement meter.

Among the methods, the method (1) can measure the space relatively accurately, but on the other hand, the method takes time to measure. Taking time to measure cannot be easily overcome.

Thus, the method (2) which allows measurement to be automated without taking time is adopted in the present embodiment.

This laser scanning is performed as shown, for example, in FIG. 2. That is, the light adjusting apparatus is placed on a measuring stand 12 (see FIG. 3), measuring light ML which is laser light is radiated from a laser displacement meter 11 parallel to the optical axis O, the laser displacement meter 11 is moved in a scanning direction SC perpendicular to the optical axis O and laser scanning is thereby conducted.

Figure 4:
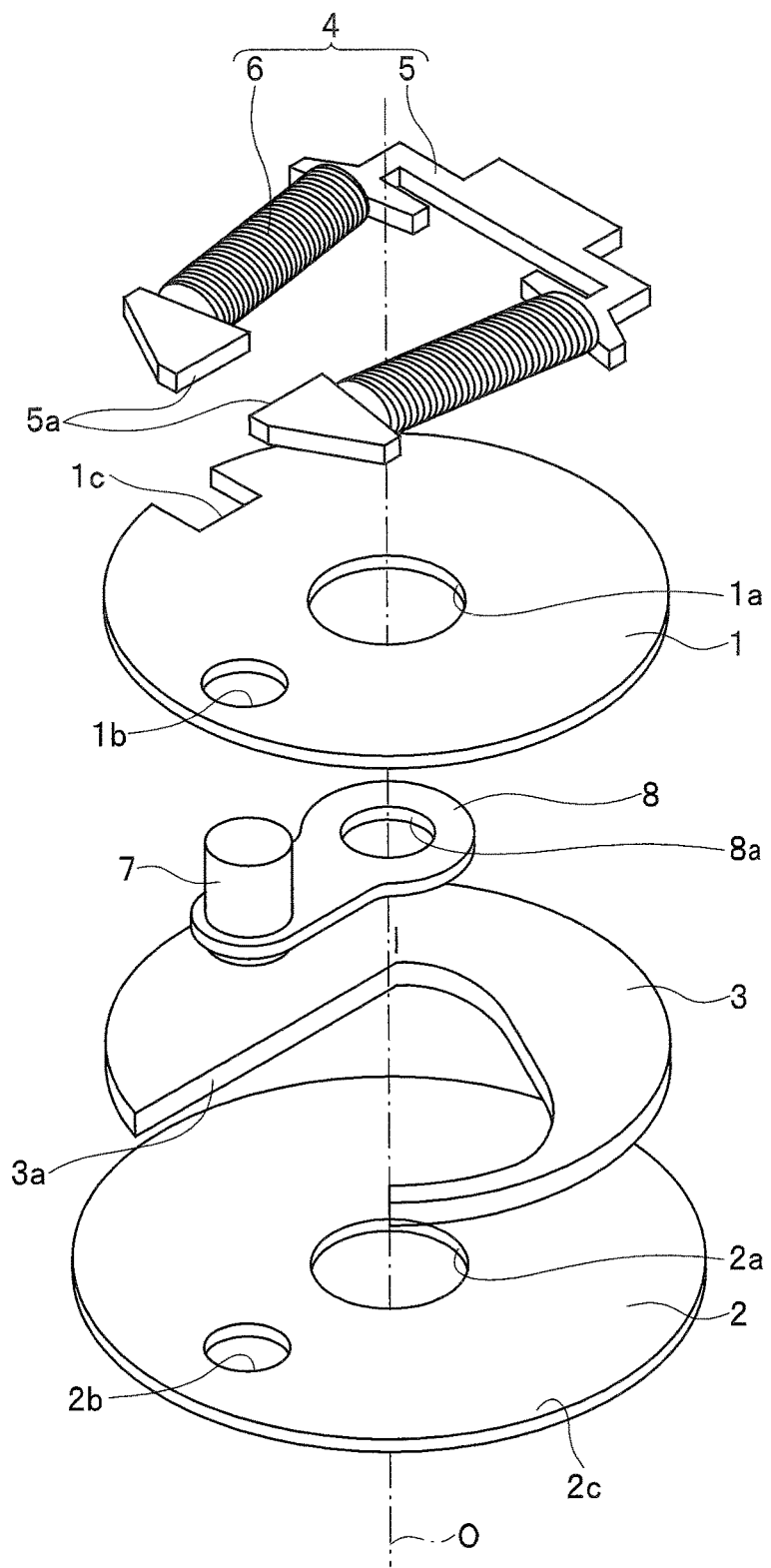
FIG. 4 is an exploded perspective view illustrating a more specific configuration of the light adjusting apparatus according to Embodiment 1 of the present invention, shown as being extended in the optical axis direction.
Figure 5:
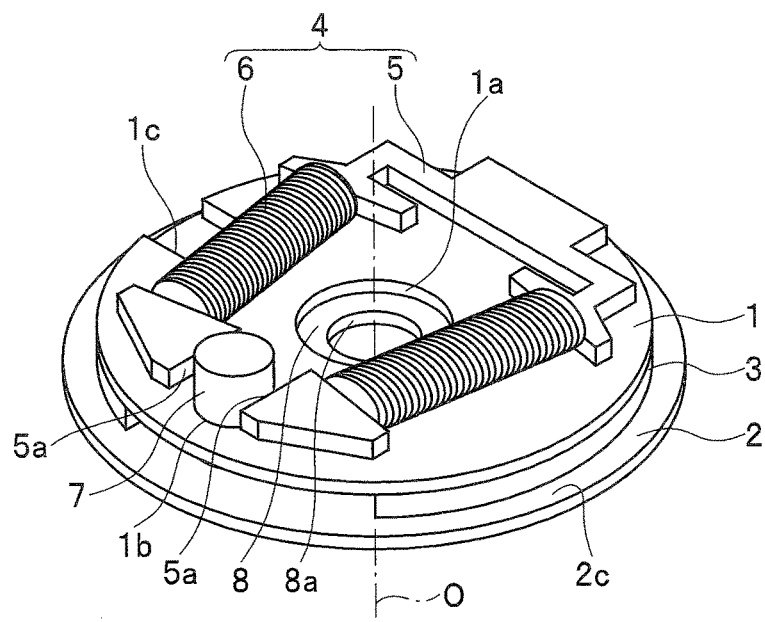
FIG. 5 is a perspective view illustrating the more specific configuration of the light adjusting apparatus according to Embodiment 1 of the present invention.

However, while the measuring light ML can be radiated onto the top surface of the first substrate 1 in the basic configuration shown in FIG. 1 to FIG. 3, the measuring light ML cannot be radiated onto the spacer 3 or the second substrate 2, and therefore the space dimension x that is a distance between substrates cannot be measured in the configuration as is. Thus, a configuration of the light adjusting apparatus that allows measurement using laser scanning will be described with reference to FIG. 4 and FIG. 5 based on the basic configuration in FIGS. 1 to 3. Here, FIG. 4 is an exploded perspective view illustrating a more specific configuration of the light adjusting apparatus of the present embodiment, shown as being extended in the optical axis direction and FIG. 5 is a perspective view illustrating the more specific configuration of the light adjusting apparatus of the present embodiment.

That is, the light adjusting apparatus of the present embodiment is provided with a measured section which is provided such that the measuring light ML radiated from a measuring direction perpendicular to the substrate surfaces of the first substrate 1 and the second substrate 2 (direction parallel to the optical axis O) passes through one of the first substrate 1 and the second substrate 2 in the measuring direction and reaches the other, in order to measure the space dimension x.

When the radiation direction of the measuring light ML is a direction from the first substrate 1 side to the second substrate 2 side, the measured section includes a first measured section configured to measure a distance from the first substrate 1 side to the spacer 3 and a second measured section configured to measure a distance from the first substrate 1 side to the second substrate 2, the first measured section is provided on the first substrate 1 so that the measuring light ML passes through the first substrate 1 in the measuring direction and reaches the spacer 3 and the second measured section is provided on the second substrate 2 so that the measuring light ML passes through the first substrate 1 and the spacer 3 in the measuring direction and reaches the second substrate 2.

The first measured section is a light transmitting portion provided on the first substrate 1 so that the spacer 3 is exposed when seen from the measuring direction and the second measured section is a light reflecting portion provided on the second substrate 2 so as to protrude from the first substrate 1 and the spacer 3 when seen from the measuring direction.

To be more specific, an omission part formed by removing part of the first substrate 1 as a notch 1*c* is provided as the light transmitting portion on the first substrate 1 so that the spacer 3 is exposed when seen from the first substrate 1 side in the optical axis O direction. Note that the omission part (light transmitting portion) for exposing the spacer 3 is assumed to be the notch 1*c* here, but it is a matter of course that the omission part may be formed as a hole as well.

Furthermore, the second substrate 2 is configured to have a greater diameter than the first substrate 1 and the spacer 3, and when seen from the first substrate 1 side in the optical axis O direction, the peripheral portion sticks out from the peripheral edges of the first substrate 1 and the spacer 3 as an extending peripheral portion 2*c* constituting the light reflecting portion.

Figure 6:
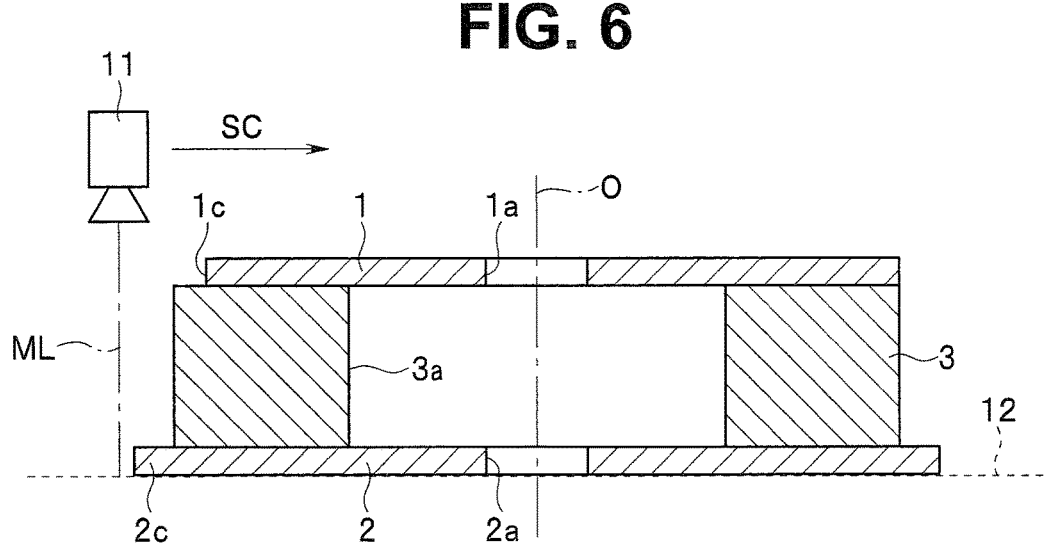
FIG. 6 is a cross-sectional view for describing a scanning direction of the light adjusting apparatus according to Embodiment 1 of the present invention.

The light adjusting apparatus in such a configuration performs scanning as shown in FIG. 6. Here, FIG. 6 is a cross-sectional view for describing the scanning direction of the light adjusting apparatus according to the present embodiment.

The laser displacement meter 11 performs scanning by radiating the measuring light ML in a direction parallel to the optical axis O while moving the laser displacement meter 11 in the scanning direction SC perpendicular to the optical axis O as described above. In this case, for the scanning direction SC selectable within the plane perpendicular to the optical axis O, the measuring light ML is radiated onto the extending peripheral portion 2*c*, and further a direction in which the measuring light ML is radiated onto the top surface of the spacer 3 exposed from the notch 1*c* is selected.

Figure 7:
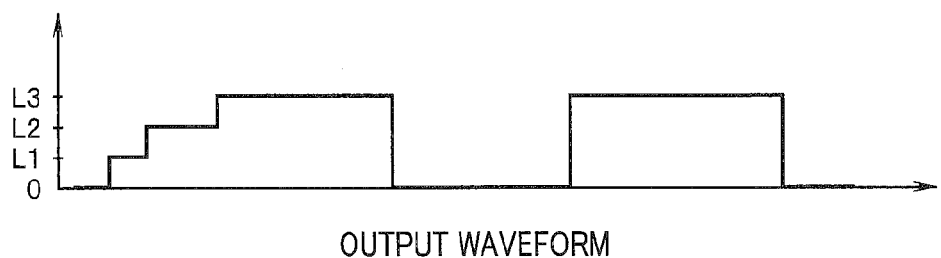
FIG. 7 is a diagram illustrating an output waveform obtained by scanning the light adjusting apparatus according to Embodiment 1 of the present invention.

FIG. 7 is a diagram illustrating an output waveform obtained by scanning the light adjusting apparatus.

When the above-described laser scanning is performed with the light adjusting apparatus placed on the measuring stand 12, if a height of the measuring stand 12 is assumed to be 0, a height L1 up to the top surface of the second substrate 2 is obtained as an output waveform, furthermore a height L2 up to the top surface of the spacer 3 exposed from the notch 1*c* is obtained as an output waveform, and then, the height L2 up to the top surface of the first substrate 1 and a height up to the measuring stand 12 via the openings 1*a* and 2*a* or the like are obtained.

Figure 8:
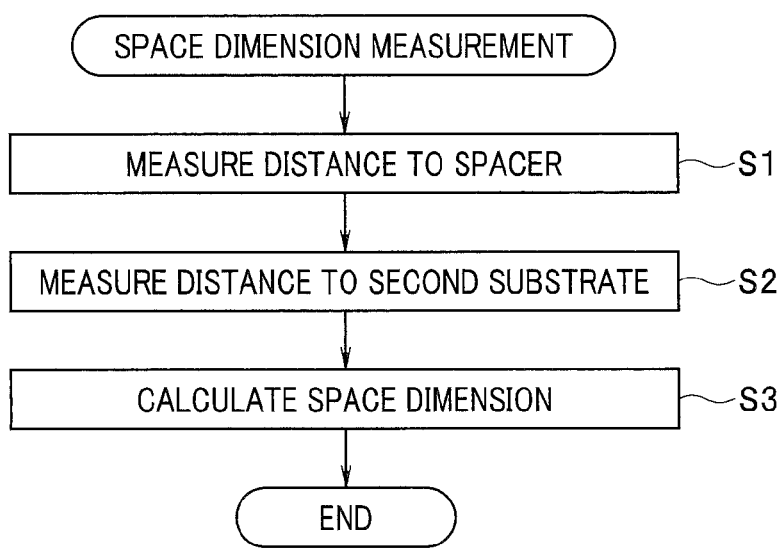
FIG. 8 is a flowchart illustrating a method for measuring a distance between substrates of the light adjusting apparatus according to Embodiment 1 of the present invention.

Next, FIG. 8 is a flowchart illustrating a method for measuring a distance between substrates of the light adjusting apparatus.

When the processing is started, the measuring light ML is radiated via the notch 1*c* which is the first measured section first, and therefore a distance x2 from the laser displacement meter 11 to the spacer 3 is measured (step S1). When the distance to be measured from the laser displacement meter 11 to the measuring stand 12 is assumed to be x0, the height L2 of the spacer 3 when the height of the measuring stand 12 is assumed to be 0 is given as $L2=(x0-x2)$.

Next, by radiating the measuring light ML onto the extending peripheral portion 2*c* which is the second measured section, the distance x1 from the laser displacement meter 11 to the second substrate 2 is measured (step S2). In this case, the height L1 of the second substrate 2 when the height of the measuring stand 12 is assumed to be 0 is $L1=(x0-x1)$.

Note that the processes in step S1 and step S2 are not limited to ones that are executed in the order, but may also be executed in the reverse order.

After that, the space dimension x is calculated based on the measurement result (step S3). This calculation is carried out according to $x=(L2-L1)=x1-x2$, that is, by subtracting the distance to the spacer 3 from the distance x1 to the second substrate 2, and therefore information on the measurement distance x0 from the laser displacement meter 11 to the measuring stand 12 is unnecessary and only two pieces of information; information on the distance x1 from the laser displacement meter 11 to the second substrate 2 and information on the distance x2 from the laser displacement meter 11 to the spacer 3 are enough. Thus, assuming that it is only two pieces of measurement information that are necessary to obtain the space dimension x makes it possible to minimize measurement errors mixed therein and improve the measurement accuracy.

Figure 9:
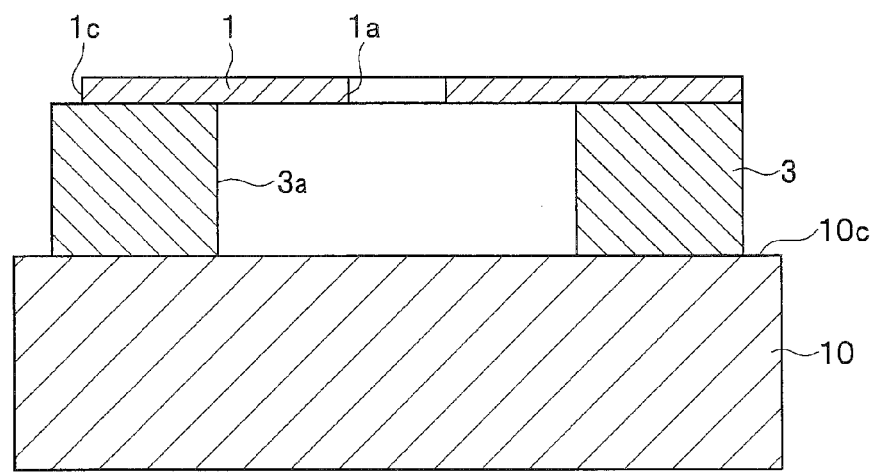
FIG. 9 is a cross-sectional view for describing a first modification of the light adjusting apparatus according to Embodiment 1 of the present invention.

Next, FIG. 9 is a cross-sectional view for describing a first modification of the light adjusting apparatus.

In the configuration shown in FIG. 4 and FIG. 5, the light adjusting apparatus is provided with the dedicated second substrate 2, but in the example shown in FIG. 9, the substrate surface of another unit 10 is used as a substitute for the second substrate 2. An extending peripheral portion 10*c* is provided on the top surface of the other unit 10 contacting the spacer 3 as a light reflecting portion that sticks out from the peripheral edges of the first substrate 1 and the spacer 3 when seen from the first substrate 1 side in the optical axis O direction.

Thus, the second substrate 2 is not limited to the dedicated substrate.

Figure 10:
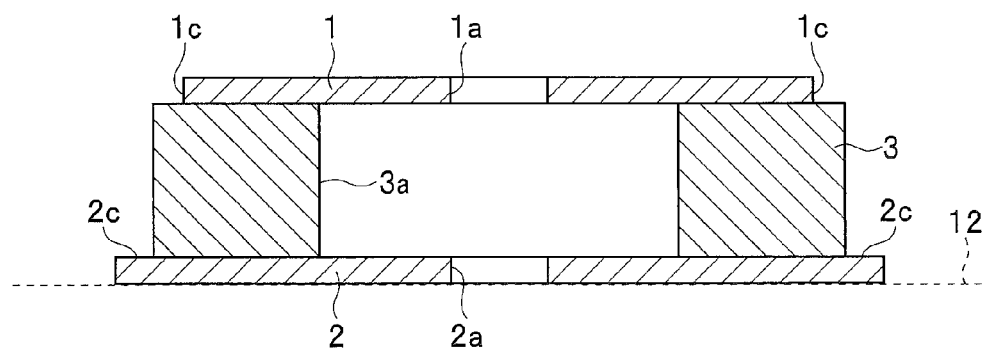
FIG. 10 is a cross-sectional view for describing a second modification of the light adjusting apparatus according to Embodiment 1 of the present invention.

FIG. 10 is a cross-sectional view for describing a second modification of the light adjusting apparatus.

This configuration example shown in FIG. 10 is an example where a plurality of measured sections are provided in which the space dimension x can be measured.

The cross-sectional view shown in FIG. 10 shows two notches 1*c* provided at opposing positions in the circumferential direction, but more notches 1*c* may be provided. Moreover, since the extending peripheral portion 2*c* is provided on the entire circumference of the second substrate 2, even when a plurality of notches 1*c* are provided, the extending peripheral portion 2*c* exists in the vicinity of any given arbitrary notch 1*c*.

Adopting the configuration as shown in FIG. 10 makes it possible to measure the space dimension x using a plurality of measured sections at different places, and therefore even when the first substrate 1 and the second substrate 2 have an inclination, it is possible to measure the inclination. Moreover, even when the first substrate 1 and the second substrate 2 are parallel to each other, it is possible to improve the measurement accuracy by statistically processing the measurement results of the plurality of measured sections.

Though not particularly illustrated, the first substrate 1 may be formed so as to have a smaller diameter than the basic configuration as shown in FIG. 1 to FIG. 3 instead of providing the notch 1*c* on the first substrate 1. In this case, the following relation is held.

(Diameter of first substrate 1)<(diameter of spacer 3)< (diameter of second substrate 2)

In the case of the configuration, measurement is possible no matter which angle direction around the optical axis O may be set as the scanning direction SC, and much simpler measurement can be performed. The relation is applicable to measurement in more directions and it is possible to measure the inclination and improve the measurement accuracy as in the case of the configuration shown in FIG. 10.

According to such Embodiment 1, since the measured section is provided so that the measuring light ML passes through one of the first substrate 1 and the second substrate 2 and reaches the other, it is possible to measure a distance between surfaces on the same side of the first substrate 1 and the second substrate 2 and measure the space dimension x if the board thickness is known.

In this case, since the first measured section to measure the distance from the first substrate 1 side to the spacer 3 and the second measured section to measure the distance from the first substrate 1 side to the second substrate 2 are provided, it is possible to measure the space dimension x, even when the board thickness is not known.

The first measured section is provided on the first substrate 1 so that the measuring light ML reaches the spacer 3 and the second measured section is provided on the second substrate 2 so that the measuring light ML reaches the second substrate 2, and it is thereby possible to directly acquire, through measurement, information on the distance x2 from the laser displacement meter 11 to the spacer 3 and information on the distance x1 from the laser displacement meter 11 to the second substrate 2, which are two pieces of information necessary to acquire the space dimension x.

To be more specific, by designating the first measured section as the light transmitting portion provided on the first substrate 1 so that the spacer 3 is exposed when seen from the measuring direction and designating the second measured section as the light reflecting portion provided on the second substrate 2 so as to protrude from the first substrate 1 and the spacer 3 when seen from the measuring direction, measurement is possible by only changing the shapes and sizes of the first substrate 1 and the second substrate 2.

Particularly when the light transmitting portion is designated as, for example, the notch 1c in the omission part in which part of the first substrate 1 is removed, the configuration has an advantage that forming is easy.

By providing a plurality of measured sections, it is possible to measure a distribution of the space dimension x within a plane perpendicular to the optical axis O and further improve measurement accuracy.

Since a configuration is adopted in which the light adjusting section 8 is rotatably and integrally fixed to the rotation shaft member 7, the rotation shaft member 7 is driven to rotate by the drive source, the light adjusting section 8 is displaced between the retracted position and the insertion position to adjust light, it is possible to insert or remove an optical element such as a focus lens, a diaphragm or a filter into/from the optical path and adjust light.

Thus, after assembling the light adjusting apparatus, it is possible to measure the distance between the first substrate 1 and the second substrate 2 in a short time period and accurately.

Embodiment 2

Figure 11:
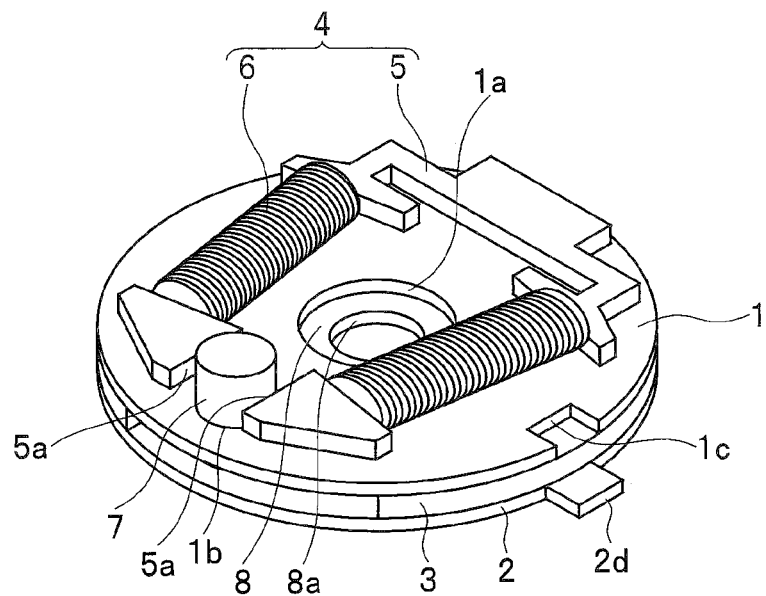
FIG. 11 is a perspective view illustrating a configuration of a light adjusting apparatus according to Embodiment 2 of the present invention.

FIG. 11 illustrates Embodiment 2 of the present invention and is a perspective view illustrating a configuration of a light adjusting apparatus. In Embodiment 2, parts similar to the parts of aforementioned Embodiment 1 are assigned similar reference numerals or the like and description of the parts will be omitted as appropriate and only differences will be mainly described.

Aforementioned Embodiment 1 assumes that the diameter of the second substrate 2 is greater than the diameter of the first substrate 1, but the present embodiment assumes that the diameter of the second substrate 2 is basically identical to the diameter of the first substrate 1 and the second substrate 2 is made to extend in the outside diameter direction for only a portion corresponding to the notch 1c to form a protruding portion 2d.

Such Embodiment 2 has substantially the same effects as the effects of aforementioned Embodiment 1 and can reduce the size of the second substrate 2, and is therefore suited to manufacturing a smaller light adjusting apparatus.

After measuring the space dimension x of the assembled light adjusting apparatus using the notch 1c and the protruding portion 2d, the protruding portion 2d may be used as a shaped part for engagement when it is assembled into another member such as the body member or a barrel member.

Embodiment 3

Figure 12:
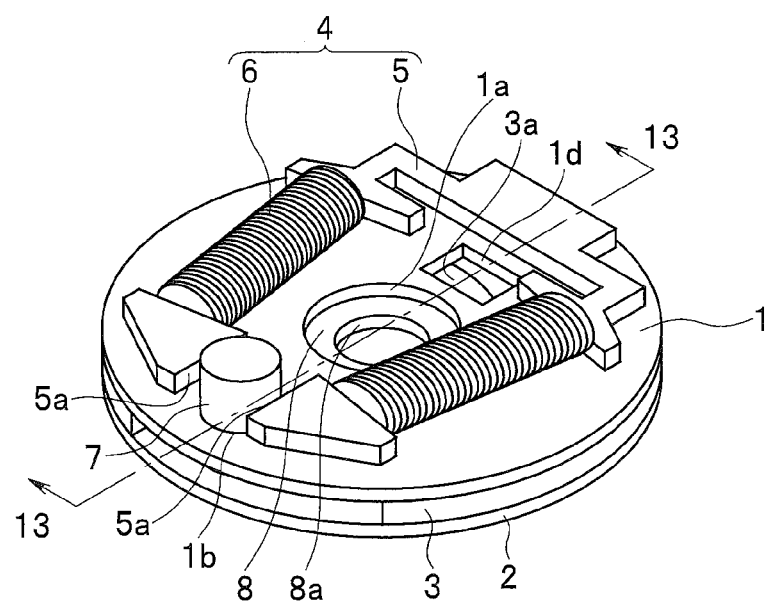
FIG. 12 is a perspective view illustrating a configuration of a light adjusting apparatus according to Embodiment 3 of the present invention.
Figure 13:
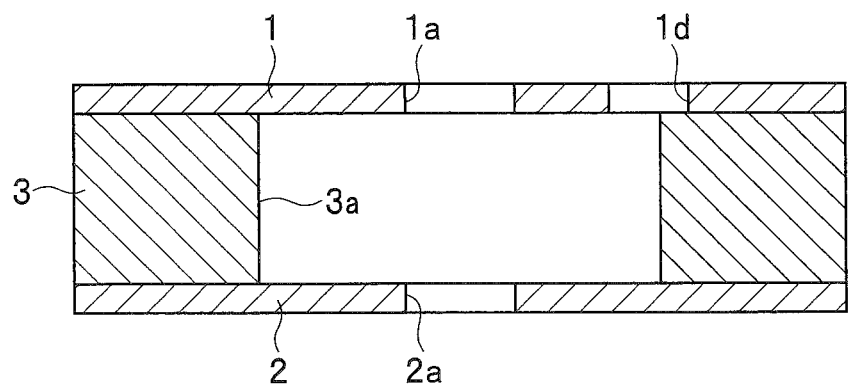
FIG. 13 is a cross-sectional view along a line 13-13 in FIG. 12 illustrating a first substrate, a second substrate and a spacer in the light adjusting apparatus according to Embodiment 3 of the present invention.

FIG. 12 and FIG. 13 illustrate Embodiment 3 of the present invention, FIG. 12 is a perspective view illustrating a configuration of a light adjusting apparatus and FIG. 13 is a cross-sectional view along a line 13-13 of FIG. 12 illustrating the first substrate 1, the second substrate 2 and the spacer 3 of the light adjusting apparatus. In the Embodiment 3, parts similar to the parts of aforementioned Embodiments 1 and 2 are assigned the same reference numerals and description of the parts will be omitted as appropriate and only differences will be mainly described.

In aforementioned Embodiments 1 and 2, the first measured section to measure the distance from the first substrate 1 side to the spacer 3 is provided on the first substrate 1 and the second measured section to measure the distance from the first substrate 1 side to the second substrate 2 is provided on the second substrate 2. In the present embodiment, however, one light transmitting portion provided on the first substrate 1 has a dual function as the first measured section and the second measured section.

That is, when seen from the measuring direction (optical axis O direction) of the first substrate 1, the light transmitting portion is provided in a portion where both the spacer 3 and the second substrate 2 are exposed. In such a configuration, the first measured section is a portion of the light transmitting portion where the spacer 3 is exposed and the second measured section is a portion of the light transmitting portion where the second substrate 2 is exposed.

To be more specific, the light transmitting portion of the present embodiment corresponds to an omission part formed by removing part of the first substrate 1 as the hole 1d. However, the light transmitting portion may also correspond to a notch formed so that both the spacer 3 and the second substrate 2 are exposed instead of the hole 1d.

Such Embodiment 3 provides substantially the same effects as the effects of aforementioned Embodiments 1 and 2, and since the second substrate 2 includes no portion protruding in a direction perpendicular to the optical axis O from the peripheral edges of the first substrate 1 and the spacer 3, it is possible to further downsize the light adjusting apparatus.

When it is possible to provide the light transmitting portion as shown in the present embodiment in portions where both the spacer 3 and the second substrate 2 are exposed according to the arrangement of the spacer 3 and the electromagnetic drive source 4 or the like, such a configuration is preferable from the perspective of downsizing the light adjusting apparatus.

Embodiment 4

Figure 14:
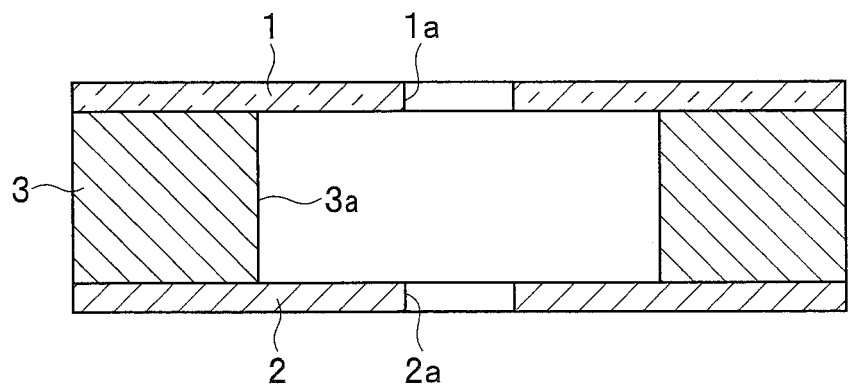
FIG. 14 is a cross-sectional view illustrating a first substrate, a second substrate and a spacer in a light adjusting apparatus according to Embodiment 4 of the present invention.

FIG. 14 illustrates Embodiment 4 of the present invention and is a cross-sectional view illustrating the first substrate 1, the second substrate 2 and the spacer 3 in the light adjusting apparatus. In the Embodiment 4, parts similar to the parts in above-described Embodiments 1 to 3 are assigned the same reference numerals or the like, description of the parts is omitted as appropriate and only differences will be mainly described.

The present embodiment adopts a transparent section having light transparency as the light transmitting portion, and more specifically, forms the first substrate 1 of a transparent material. When such a configuration is adopted, the portion where the spacer 3 is visible through the transparent first substrate 1 becomes the first measured section and the portion where the second substrate 2 is visible becomes the second measured section.

Note that the notch 1c in aforementioned Embodiments 1 and 2 or the hole 1d in aforementioned Embodiment 3 may be configured as the transparent section instead of the omission part.

Such Embodiment 4 has substantially the same effects as the effects in aforementioned Embodiments 1 to 3, need not change the shapes of the first substrate 1 and second substrate 2 from the basic shapes at all and can measure the space dimension x by only changing the constituent material to a transparent material.

Next, reference examples relevant to the aforementioned respective embodiments will be described with reference to FIG. 15 to FIG. 17. In the following reference examples, parts similar to the parts in the above-described respective embodiments are assigned the same reference numerals or the like, description of the parts is omitted as appropriate and only differences will be mainly described.

Reference Example 1

Figure 15:
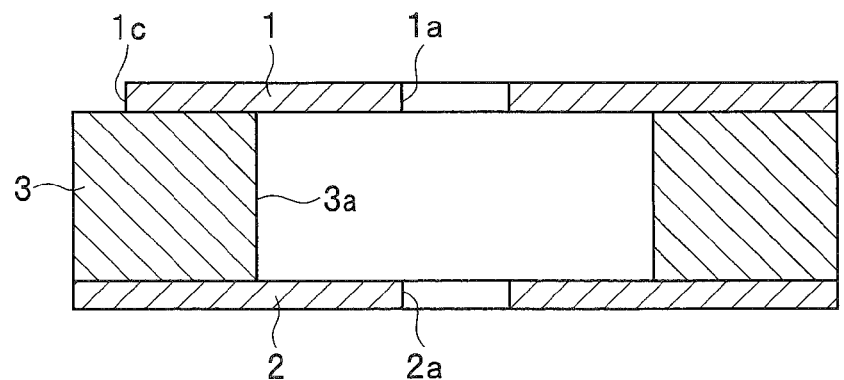
FIG. 15 is a cross-sectional view illustrating a first substrate, a second substrate and a spacer in a light adjusting apparatus according to reference example 1 relevant to the above-described respective embodiments of the present invention.

FIG. 15 is a cross-sectional view illustrating the first substrate 1, the second substrate 2 and the spacer 3 in the light adjusting apparatus of reference example 1.

In the reference example 1, the notch 1c of aforementioned Embodiments 1 and 2 is provided, whereas neither the extending peripheral portion 2c of Embodiment 1 nor the protruding portion 2d of Embodiment 2 is provided.

In the case of the reference example 1, the length including both the thickness of the second substrate 2 and the thickness of the spacer 3 is calculated by measuring the distance from the laser displacement meter 11 to the measuring stand 12 (see FIG. 3 or the like) and the distance from the laser displacement meter 11 to the top surface of the spacer 3 and calculating a difference value between the distances.

Furthermore, the board thickness of the second substrate 2 as a single unit is assumed to be substantially the same as the board thickness of the second substrate 2 after the light adjusting apparatus is assembled, and so the information on the board thickness is also used.

That is, the space dimension x is calculated by subtracting the board thickness of the second substrate 2 as a single unit from the length including both the thickness of the second substrate 2 and the thickness of the spacer 3 calculated as described above.

With such a configuration of reference example 1, the space dimension x can be measured with a certain degree of accuracy.

Reference Example 2

Figure 16:
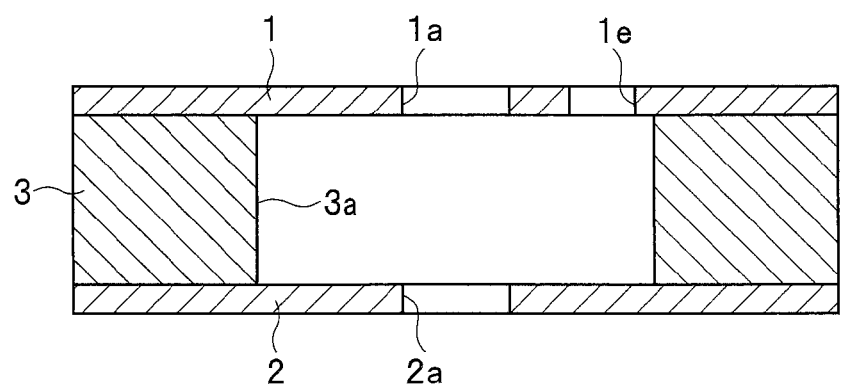
FIG. 16 is a cross-sectional view illustrating a first substrate, a second substrate and a spacer in a light adjusting apparatus according to reference example 2 relevant to the above-described respective embodiments of the present invention.

FIG. 16 is a cross-sectional view illustrating the first substrate 1, the second substrate 2 and the spacer 3 in the light adjusting apparatus of reference example 2.

In the reference example 2, although a hole 1e similar to the hole 1d of aforementioned Embodiment 3 is provided, when seen from the first substrate 1 side in the optical axis O direction, the hole 1e is provided not at a position of the hole 1d or the like where both the spacer 3 and the second substrate 2 are exposed, but at a position where only the second substrate 2 is exposed.

In the case of the reference example 2, the length including both the thickness of the first substrate 1 and the thickness of the spacer 3 is calculated by measuring the distance from the laser displacement meter 11 to the top surface of the second substrate 2 via the hole 1e and the distance from the laser displacement meter 11 to the top surface of the first substrate 1 and calculating a difference value between the distances.

Furthermore, since the board thickness of the first substrate 1 as a single unit is assumed to be substantially the same as the board thickness of the first substrate 1 after the light adjusting apparatus is assembled, information on the board thickness is also used.

That is, the space dimension x is calculated by subtracting the board thickness of the first substrate 1 as a single unit from the length including both the thickness of the first substrate 1 and the thickness of the spacer 3 calculated as described above.

With such a configuration of reference example 2, it is also possible to measure the space dimension x with a certain degree of accuracy in substantially the same way as in reference example 1.

Reference Example 3

Figure 17:
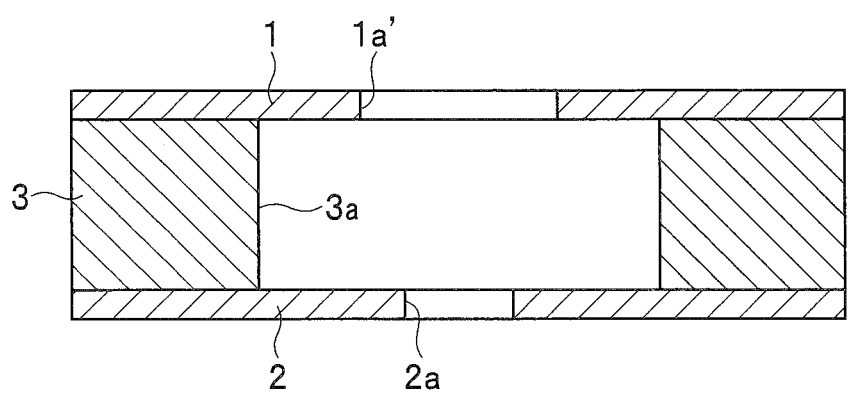
FIG. 17 is a cross-sectional view illustrating a first substrate, a second substrate and a spacer in a light adjusting apparatus according to reference example 3 relevant to the above-described respective embodiments of the present invention.

FIG. 17 is a cross-sectional view illustrating the first substrate 1, the second substrate 2 and the spacer 3 in the light adjusting apparatus of reference example 3.

In the reference example 3, an opening 1a' of the first substrate 1 is configured to have a greater diameter than the diameter of the opening 2a of the second substrate 2 so that the top surface of the second substrate 2 is exposed via the opening 1a' when seen from the first substrate 1 side in the optical axis O direction. Therefore, the opening 1a' configured to pass light to be adjusted by the light adjusting section 8 through the opening 1a' also serves as the light transmitting portion to allow the measuring light ML to pass through the opening 1a'.

The measuring method of reference example 3 is similar to the method of aforementioned reference example 2.

Such a configuration of reference example 3 can also exert substantially the same effects as the effects in reference example 2.

Note that the opening 1a' shown in reference example 3 is not limited to a circular hole when it is not an optical opening that functions as an opening diaphragm. Thus, in this case, if the shape of the opening 1a' may be configured so that not only the top surface of the second substrate 2 but also the top surface of the spacer 3 is exposed, effects similar to the effects in aforementioned Embodiment 3 can be achieved. In this case, the opening 1a' also serves as the light transmitting portion provided on the first substrate 1 so that the spacer 3 and the second substrate 2 are exposed.

Furthermore, even when the opening 1a can expose the top surface of the second substrate 2 but cannot expose the top surface of the spacer 3, if the opening 1a' is used in combination with the notch 1c that functions as the first measured section shown in reference example 1, it is possible to achieve substantially the same effects as the effects in aforementioned Embodiment 3. In this case, the opening 1a' also serves as the second measured section.

Moreover, the aforementioned respective embodiments and respective reference examples have been described assuming that since the electromagnetic drive source 4 is disposed on the first substrate 1, the measuring light ML is radiated from the first substrate 1 side. However, a configuration in which the measuring light ML is radiated from the second substrate 2 side may also be adopted from the perspective of measuring the space dimension x.

The light adjusting apparatus and the method for measuring a distance between substrates of the light adjusting apparatus have been described above, but the invention may also be a program for causing a computer to execute processes similar to those of the method for measuring a distance between substrates of the light adjusting apparatus or a nonvolatile recording medium or the like which is readable to a computer that records the program.

Note that the present invention is not limited to the aforementioned embodiments as they are, but may be implemented by modifying components in the implementation phase without departing from the spirit and scope of the present invention. Furthermore, various aspects of the invention can be formed through an appropriate combination of the plurality of components disclosed in the above embodiments. For example, several components may be deleted from all the components disclosed in the embodiments. Moreover, components across different embodiments may be combined as appropriate. Thus, it goes without saying that various modifications and applications can be made without departing from the spirit and scope of the present invention.

What is claimed is:

1. A light adjusting apparatus comprising:
a first substrate;
a second substrate whose substrate surface is disposed so as to face a substrate surface of the first substrate;
a spacer configured to separate the first substrate from the second substrate so as to form a space between the substrate surfaces facing each other;
a light adjusting section arranged so as to be movable in the space and configured to adjust light; and
a measured section provided so that measuring light radiated from a measuring direction perpendicular to the substrate surface to measure a dimension of the space passes through one of the first substrate and the second substrate in the measuring direction and reaches another of the first substrate and the second substrate.

2. The light adjusting apparatus according to claim 1, wherein the measured section comprises:
a first measured section configured to measure a distance from the first substrate side to the spacer; and
a second measured section configured to measure a distance from a side of the first substrate to the second substrate.

3. The light adjusting apparatus according to claim 2, wherein the first measured section is provided on the first substrate so that the measuring light passes through the first substrate in the measuring direction and reaches the spacer, and
the second measured section is provided on the second substrate so that the measuring light passes through the first substrate and the spacer in the measuring direction and reaches the second substrate.

4. The light adjusting apparatus according to claim 3, wherein the first measured section is a light transmitting portion provided on the first substrate so that the spacer is exposed when seen from the measuring direction, and
the second measured section is a light reflecting portion provided on the second substrate so as to protrude from the first substrate and the spacer when seen from the measuring direction.

5. The light adjusting apparatus according to claim 4, wherein the light transmitting portion is an omission part in which part of the first substrate is removed and formed into a hole or a notch.

6. The light adjusting apparatus according to claim 4, wherein the light transmitting portion is a transparent section having light transparency.

7. The light adjusting apparatus according to claim 2, further comprising a light transmitting portion provided on the first substrate so that the spacer and the second substrate are exposed when seen from the measuring direction,
wherein the first measured section is a portion in which the spacer in the light transmitting portion is exposed, and
the second measured section is a portion in which the second substrate in the light transmitting portion is exposed.

8. The light adjusting apparatus according to claim 7, wherein the light transmitting portion is an omission part in which part of the first substrate is removed and formed into a hole or a notch.

9. The light adjusting apparatus according to claim 7, wherein the light transmitting portion is a transparent portion having light transparency.

10. The light adjusting apparatus according to claim 7, wherein the first substrate includes an opening configured to pass light to be adjusted by the light adjusting section and the opening also serves as the light transmitting portion.

11. The light adjusting apparatus according to claim 1, wherein the measured section is provided in plurality.

12. The light adjusting apparatus according to claim 1, further comprising:
a rotation shaft member configured to be rotatably attached to the first substrate and the second substrate so as to be perpendicular to the substrate surfaces of the first substrate and the second substrate; and
a drive source configured to rotate the rotation shaft member,
wherein openings to allow light to pass are formed in the first substrate and the second substrate,
the light adjusting section is configured to adjust the light passing through the openings and is rotatably and integrally fixed to the rotation shaft member, and
the rotation shaft member is driven to rotate by the drive source to cause the light adjusting section to displace between a retracted position retracted from an optical path of the light passing through the openings and an insertion position inserted into the optical path of the light passing through the openings.

13. A method for measuring a distance between substrates of a light adjusting apparatus, the light adjusting apparatus comprising:
a first substrate;
a second substrate whose substrate surface is disposed so as to face a substrate surface of the first substrate;
a spacer configured to separate the first substrate from the second substrate so as to form a space between the substrate surfaces facing each other;
a light adjusting section disposed so as to be movable in the space and configured to adjust light; and a measured section provided so that measuring light radiated from a measuring direction perpendicular to the substrate surface to measure a dimension of the space passes through one of the first substrate and the second substrate in the measuring direction and reaches another of the first substrate and the second substrate, the measured section comprising:

a first measured section configured to measure a distance from a side of the first substrate to the spacer; and a second measured section configured to measure a distance from the first substrate side to the second substrate, the method comprising:

a step of measuring the distance to the spacer by radiating the measuring light via the first measured section;

a step of measuring the distance to the second substrate by radiating measuring light via the second measured section; and a step of acquiring a dimension of the space by subtracting the distance to the spacer from the distance to the second substrate.

* * * * *